Nov. 5, 1940.   C. H. PEARCE   2,220,794
MITER AND FRAMING TOOL
Filed March 13, 1939   2 Sheets-Sheet 2
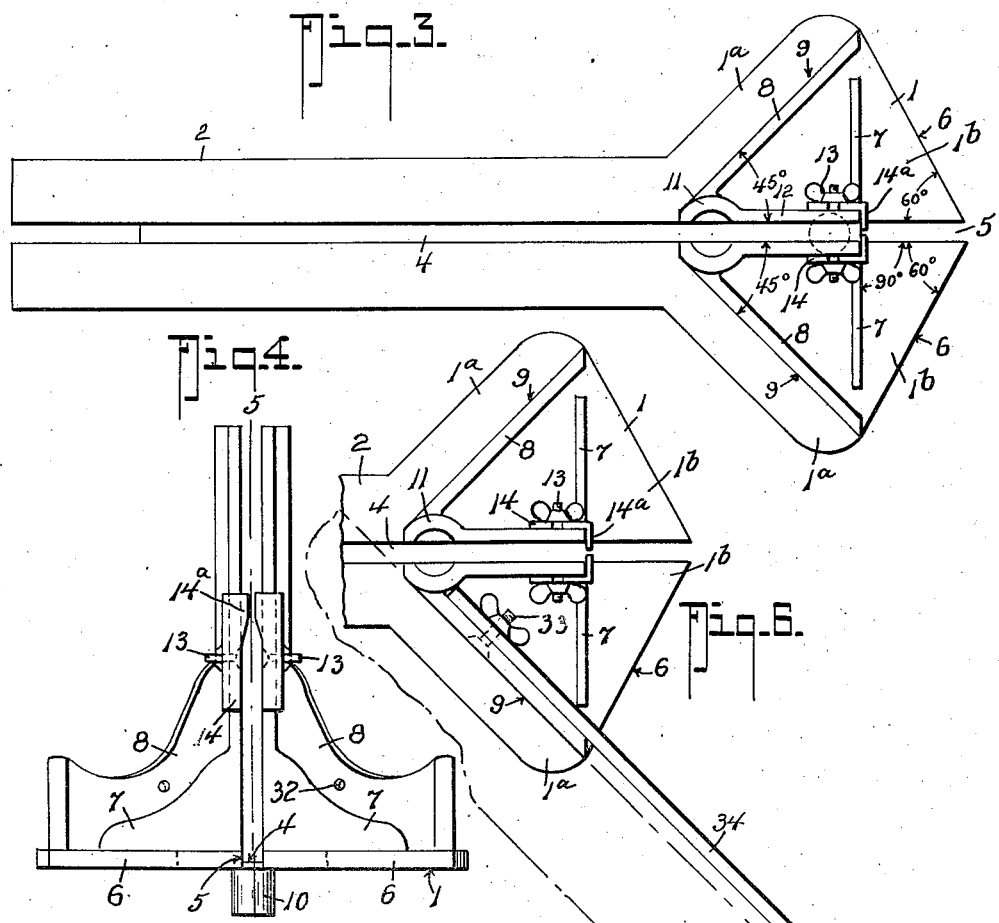
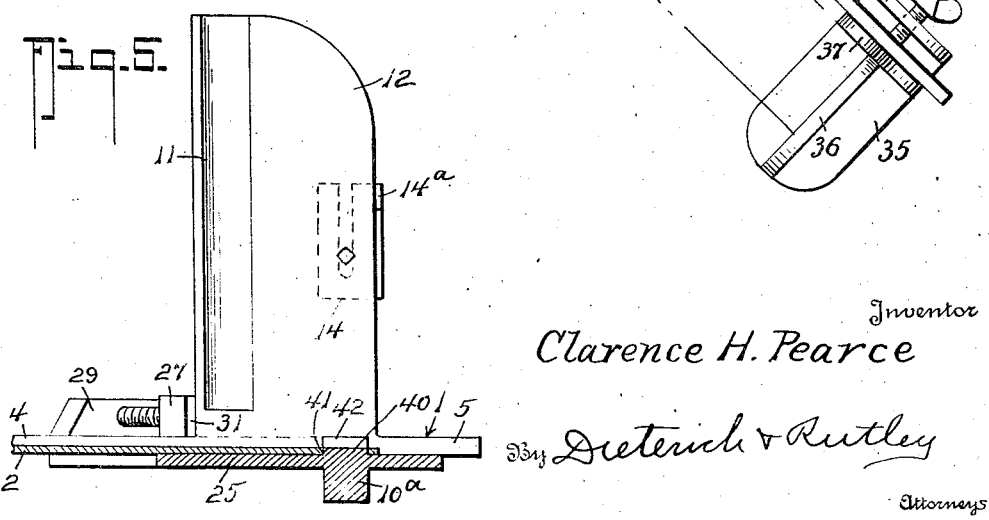
Inventor
Clarence H. Pearce
By Dieterich & Rutley
Attorneys.

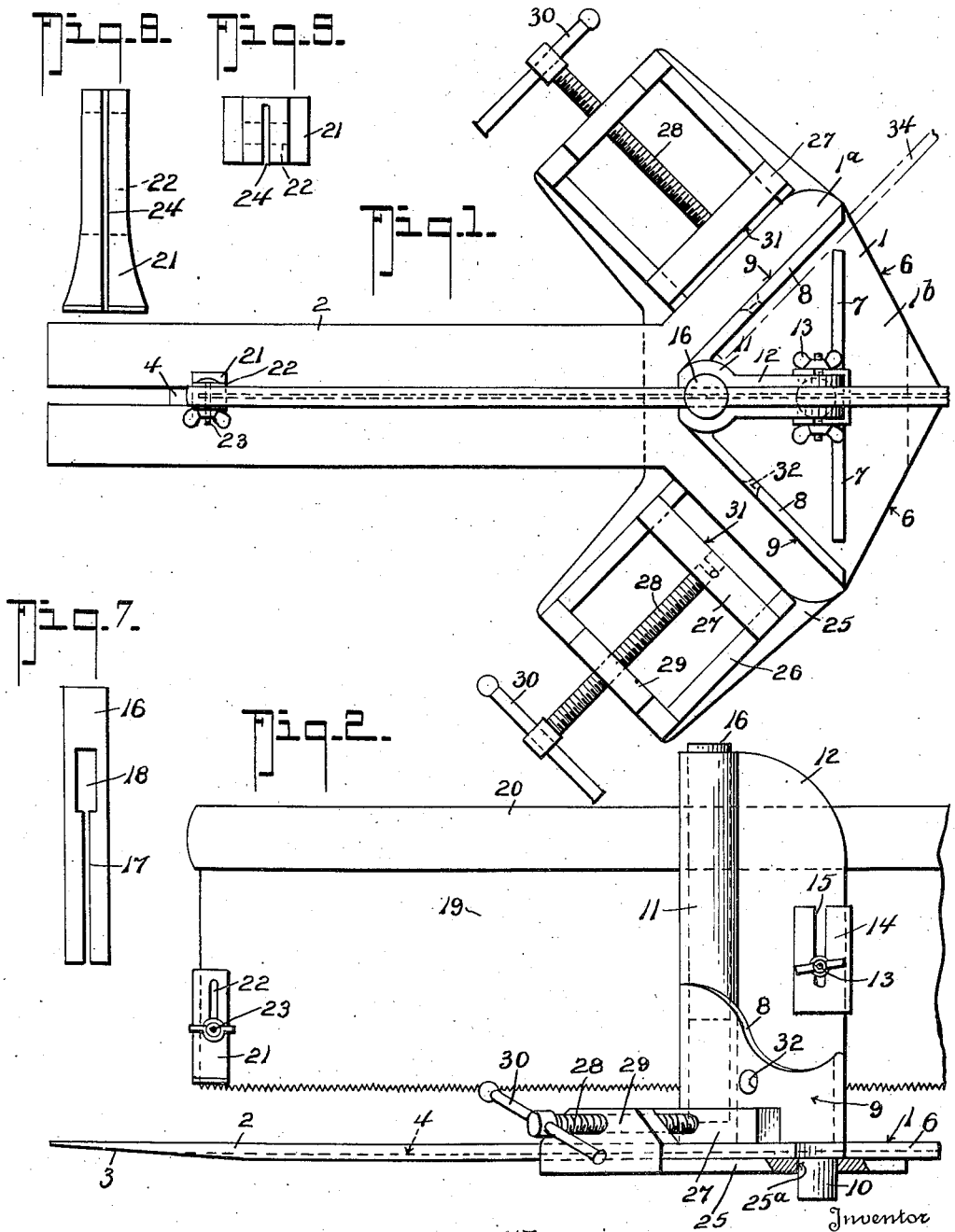

Patented Nov. 5, 1940

2,220,794

UNITED STATES PATENT OFFICE 2,220,794

MITER AND FRAMING TOOL

Clarence H. Pearce, Hyattsville, Md.

Application March 13, 1939, Serial No. 261,597

2 Claims. (Cl. 143—86)

My invention relates generally to carpenters' tools and especially to miter and framing tools.

It has for its particular objects to provide a miter and framing tool that is flexible and practical enough to be used in construction of a building by carpenters, or to be used by craftsmen in their homes or shops; to provide such a tool as will eliminate the common miter box (usually of wood) which after short usage becomes worthless; to provide a tool of the character stated that may easily be mounted on a saw horse or work bench by simply boring a small hole in the horse or bench; to provide a tool so constructed that it can be turned to any desired angle regardless of the length of the material to be sawed; to provide a tool that can be held on the side of a frame or jamb so as to cut both miters in the trim which has been temporarily nailed in place; to provide a tool which will hold material in position so that it may be readily sawed or nailed; to provide a tool whose saw blade is adjustable so that material can be sawed to a certain depth, called kerfing; to provide a tool that can easily be carried in the average carpenter's tool box; to provide a tool which eliminates the use of squares in laying out material to be sawed; to provide a tool whose angles are all that are necessary for practical use; to provide a miter box which will be safe to use since it is almost impossible to saw one's hand or fingers should the material or the tool slip while being used; to provide a tool in which the construction is such that the saw can be reversed in the saw guide so as to saw from either end of the tool; to provide a tool which can also be used to saw metal by using a metal saw in place of a wood saw; to provide a tool of the character described with a gauge by the use of which material can be cut at desired lengths; and finally to provide a tool, having all the above advantageous features, which can be manufactured at low cost, sold at a reasonable price and yet be practically indestructible through usage and handling.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a top plan view of the tool complete save for the length-gauge attachment, a part of the saw being broken away.

Fig. 2 is a side elevation of the same.

Fig. 3 is a top plan view of the principal unit of the tool.

Fig. 4 is a rear elevation of the same.

Fig. 5 is a detail vertical longitudinal section on the line 5—5 of Fig. 4 but showing a slight modification.

Fig. 6 is a detail plan view showing how the length-gauge attachment is used.

Fig. 7 is a detail front elevation of the saw-carried slide bearing element.

Fig. 8 is an elevation of the saw depth gauge.

Fig. 9 is a top plan view of the same.

In the drawings in which like numbers of reference indicate like parts in all the figures, I represents the base of the principal unit of the tool. The base includes an elongated portion or tongue 2 whose free end is preferably bevelled off as at 3 (Fig. 2) to aid in slipping the tongue beneath the trim when it is desired to cut trim while temporarily nailed to the framing. The base, including its tongue portion, is longitudinally grooved, the rear end of the base being slotted as at 5, the slot extending inwardly only to the rear transverse wall 7, 7. This wall is normal to the base and to the length of the groove 4 and serves as a stop against which a board may be held for a straight-across cut.

The base 1 also has two edges 6 forming the hypotenuse of two 30° angles whose bases are the wall 7—7, one a right hand and the other a left hand angle. The base is further provided with two upstanding walls 8, normal to the plane of the base and making an angle of 90° with one another, and angles of 45° with the groove 4. The walls 7 and 8 are set in from the edges of the base 1 to leave portions 1ª and 1ᵇ for the lumber to be cut to lie on.

The outer faces 9 of the walls 8 are normal to the surfaces 1ª and lie at angles of 45° to the plane of the saw blade 19.

In the embodiment of the invention (preferred) the base 1 has a lug 10 on its under side which is designed to fit into a hole in the member on which it is supported. This member may be a work bench or saw horse or the third unit which constitutes a part of the tool.

Extending upwardly from the base 1 is the saw guide. The saw guide comprises the guide post 11 and the parallel longitudinal walls 12 between which the saw passes and the space between which is the same as the width of the groove 4.

The post 11 is bored to receive the saw-carried slide bearing 16 which is slotted at 18 and 17 for the saw back 20 and blade 19 respectively.

In order to steady the saw and prevent pivotal movement on the axis of the bearing 16, I provide a pair of adjustable saw guides 14 secured to the walls 12 by bolts 13 with wing nuts, the plates 14 having slots 15 for adjustments and portions 14ᵃ to overlie the rear edges of the walls 12 and lie close against the sides of the saw blade.

In order that the saw may not cut through the base, the blade is provided with a gauge 21 vertically adjustably mounted over the front edge and sides of the blade by means of a bolt, with wing nut, piercing the blade and slots 22. The gauge 21 also serves as a saw-depth-cut gauge in sawing kerfs. The gauge 21 is slotted at 24 (Figs. 8 and 9) to receive the blade 19.

The third unit (the saw constituting the second unit of the tool) comprises a sub-base or underbase plate 25 having (in the one form) a hole 25ᵃ to receive the lug 10. It also has two arms extending at right angles to the walls 9 and carrying slideways 26 whose inner ends abut the outer edges of the base portion 1ᵃ (which edges are parallel to the walls 9) and thus the first unit is rigidly held in place on the third unit to enable proper cooperation of the units as will later appear. At the outer ends of the arms which carry the slideways 26 are bridge walls 29 through which the clamp screws 28 pass. These screws have handles 30 at their outer ends and at their inner ends they carry clamp blocks 27 whose faces 31 lie parallel to the faces 9 of walls 8 with which the blocks 27 cooperate. The screws 28 are swivelly connected to the blocks 27 in any approved way so the blocks will slide back and forth on the slideways 26 as the screws 28 are turned.

In the modified construction shown in Fig. 5, instead of providing the base 1 with the lug 10, the lug is provided on the underbase 25, as at 19ᵃ, and other suitable means are provided to hold base 1 from sliding on base 25, such for example as providing the base 25 with a second lug 40 and the base 1 with a hole 41 to receive it, the lug 40 being grooved as at 42 to register with groove 4.

In miter cutting picture frame strips or moulding or in fact any boards whose width is within the range of the clamp 27, the same is placed between a block 27 and the opposite wall 9 and screw 28 tightened, thus holding the piece securely while operating the saw and, if desired, while nailing the mitered pieces together.

When the tool is to be used to cut the miters or trim temporarily nailed to a door or window frame, only the first and second units are used. The tongue 2 is slipped beneath the lapped trim at the corner until walls 9—9 rest against the trim and held there while the saw is operated to make the cut. Then after pulling out the tool the trim can be permanently nailed in place with a good clean joint of the pieces.

When one desires to cut miters as fixed distances or lengths of a number of pieces the gauge bar 34 (which may or may not be calibrated, as desired) is secured to a wall 8 (see Fig. 6) and the attachment 35 is clamped thereto at the proper distance to give the cut at the desired location. The attachment 35 includes a base which lies in the same plane as base 1 and has a rib 36 normal to the plane of the base 1 and to that of the wall 8. It also has ribs 37 and 38 between which the bar or stick 34 is clamped by a screw 39.

Other uses and ways of utilizing my tool will readily appear to those skilled in the art and further reference thereto in this specification is deemed unnecessary.

From the foregoing description, taken in connection with the accompanying drawings, it is thought that the construction, operation and advantages of the invention will be clear to those skilled in the art to which it relates.

What I claim is:

1. A carpenter's tool including a base proper and a tongue extending from the base proper, two upstanding walls on the base proper whose outer faces are disposed in planes normal to that of the base proper and the tongue and which lie at a given angle to each other, a saw guide bisecting said angle and lying between said upstanding walls, said guide having a vertical saw passage lining up with said tongue, a saw operatively disposed in said saw passage, means to limit the saw's movement to a single plane to which plane said outer faces lie at equal angles, said tongue being free at its outer end and being formed of a thin flat elongated body by virtue of which the tongue is adapted for being inserted between the overlapped ends of door and window trim while the trim remains nailed in place.

2. A portable carpenter's tool which includes a thin, flat base, two upstanding walls on the base, the outer faces of which walls are disposed in planes normal to that of the base proper and lie at an angle of 90° to one another, a thin flat elongated tongue projecting from the base in a direction bisecting said angle, said tongue having a free end formed to be slipped under the overlapped ends of door and window trim after the trim has been nailed in place, the upper and lower faces respectively of said tongue and base lying in parallel planes, a saw guide bisecting said angle and lying between said upstanding walls, said saw guide having a vertical saw passage lining up with said tongue, said tongue and said base having a groove in the top which also bisects said angle and extends beneath said saw passage, and a lug projecting from and below said base, the axis of said lug intersecting said groove and lying normal to the base, a saw operatively disposed in said saw guide, and means to limit the saw's movement to a single plane bisecting said angle.

CLARENCE H. PEARCE.